US009022854B2

(12) United States Patent
Gelber et al.

(10) Patent No.: US 9,022,854 B2
(45) Date of Patent: May 5, 2015

(54) AUTOMATED REMOTE CONFIGURATION OF WAGERING GAME MACHINES

(75) Inventors: Phil Gelber, Glen Ellyn, IL (US); Larry Pacey, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1141 days.

(21) Appl. No.: 12/438,239

(22) PCT Filed: Aug. 21, 2007

(86) PCT No.: PCT/US2007/018489
§ 371 (c)(1), (2), (4) Date: Feb. 20, 2009

(87) PCT Pub. No.: WO2008/024349
PCT Pub. Date: Feb. 28, 2008

(65) Prior Publication Data

US 2010/0234097 A1 Sep. 16, 2010

Related U.S. Application Data

(60) Provisional application No. 60/823,055, filed on Aug. 21, 2006.

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.
CPC .............. *G07F 17/323* (2013.01); *G07F 17/32* (2013.01); *G07F 17/3234* (2013.01)

(58) Field of Classification Search
USPC .................. 463/21, 1, 16–20, 25, 29, 40–43
See application file for complete search history.

(56) References Cited

U.S. PATENT DOCUMENTS

| | | | | |
|---|---|---|---|---|
| 5,505,461 | A * | 4/1996 | Bell et al. | 463/25 |
| 6,446,864 | B1 * | 9/2002 | Kim et al. | 235/382 |
| 6,749,510 | B2 | 6/2004 | Giobbi | |
| 6,905,409 | B1 * | 6/2005 | Bradshaw | 463/25 |
| 2003/0003988 | A1 * | 1/2003 | Walker et al. | 463/21 |
| 2003/0130039 | A1 * | 7/2003 | Nelson | 463/42 |
| 2003/0171149 | A1 * | 9/2003 | Rothschild | 463/42 |
| 2004/0133485 | A1 | 7/2004 | Schoonmaker et al. | |
| 2004/0166940 | A1 | 8/2004 | Rothschild | |
| 2005/0054445 | A1 * | 3/2005 | Gatto et al. | 463/42 |
| 2006/0046824 | A1 * | 3/2006 | Silva et al. | 463/16 |
| 2006/0217193 | A1 * | 9/2006 | Walker et al. | 463/29 |
| 2007/0026935 | A1 * | 2/2007 | Wolf et al. | 463/25 |
| 2007/0026942 | A1 * | 2/2007 | Kinsley et al. | 463/29 |

OTHER PUBLICATIONS

"International Application Serial No. PCT/US2007/018489, International Search Report and Written Opinion mailed Aug. 20, 2008", 9 pgs.

* cited by examiner

*Primary Examiner* — Milap Shah
(74) *Attorney, Agent, or Firm* — Nixon Peabody LLP

(57) ABSTRACT

Systems and methods for providing configurations for one or more wagering game machines are described. The systems and methods receive performance data for the wagering game machine and analyze the performance data in accordance with a rule set. Based on the rule set and the performance data, new or modified configurations may be generated for one or more wagering game machines.

20 Claims, 6 Drawing Sheets

AUTOMATED REMOTE CONFIGURATION OF WAGERING GAME MACHINES

RELATED APPLICATION

This patent application is a U.S. National Stage Filing under 35 U.S.C. 371 from International Patent Application Ser. No. PCT/US2007/018489, filed Aug. 21, 2007, and published on Feb. 28, 2008, as WO 2008/024349 A2 and republished as WO 2008/024349A3, which claims the priority benefit of U.S. Provisional Patent Application Ser. No. 60/823,055 filed Aug. 21, 2006 and entitled "AUTOMATED REMOTE CONFIGURATION OF WAGERING GAME MACHINES", the contents which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007 WMS Gaming, Inc.

FIELD

Embodiments of the inventive subject matter relate generally to wagering game systems, and more particularly, to remotely providing configurations for wagering game machines.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering gaming content. In order to maintain player interest, wagering game machine makers frequently update wagering game content with new game themes, game settings, bonus events, game software, and other electronic data.

As a result of changing interest in wagering games, it is in the economic interest of a casino to periodically change the wagering games that are provided. The change can be minor, such as updating content, denominations, paybacks or bonus rounds for the wagering game, or it can be major, such as removing the wagering game entirely and replacing it with a different wagering game. Unfortunately, deciding what changes to make that will result in a higher return on investment can be a difficult process.

BRIEF DESCRIPTION OF THE FIGURES

Embodiments of the invention are illustrated by way of example and not limitation in the Figures of the accompanying drawings in which.

DESCRIPTION OF THE EMBODIMENTS

Example Operating Environment

Example Wagering Game Machine

Figure 1:
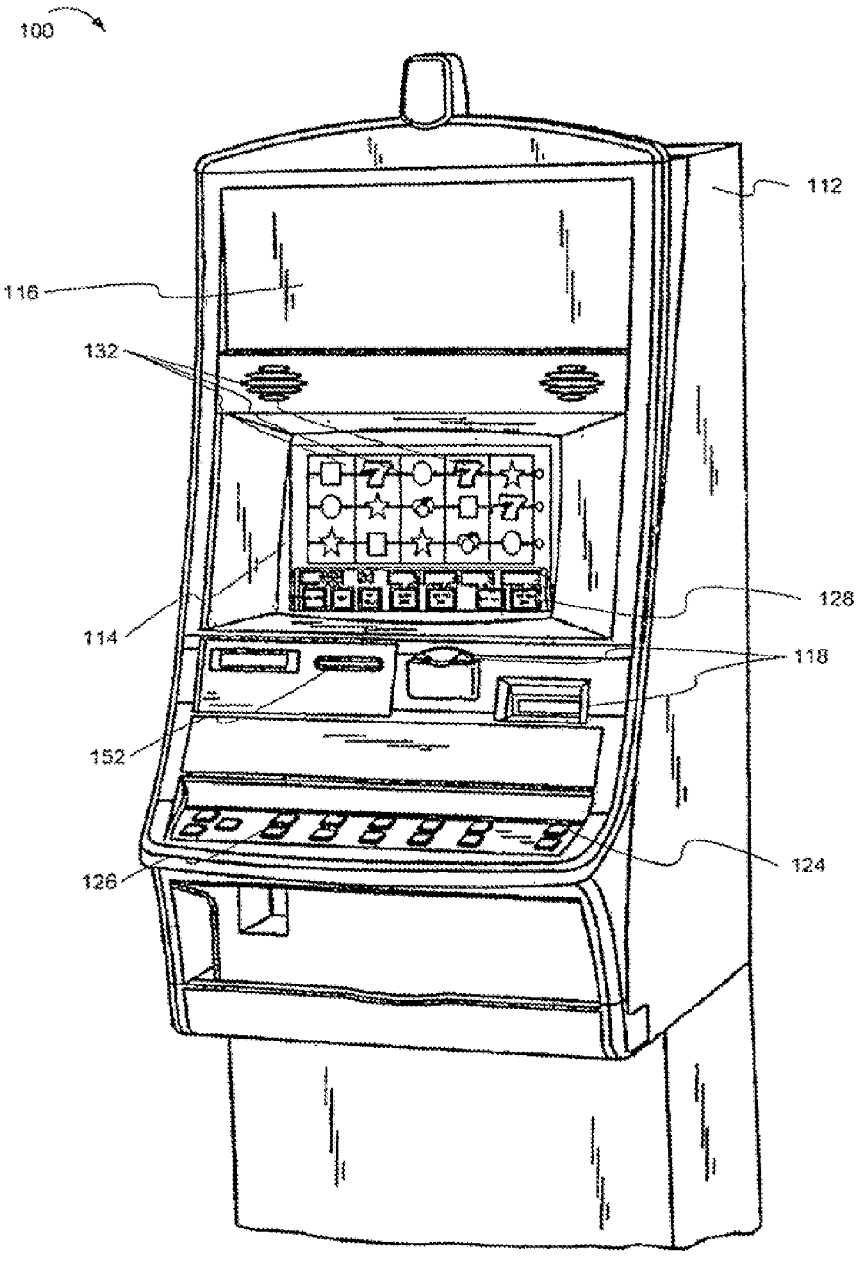
FIG. 1 shows an example embodiment of a wagering game machine.

FIG. 1 is a perspective view of a wagering game machine, according to example embodiments of the invention. Referring to FIG. 1, a wagering game machine 100 is used in gaming establishments, such as casinos. According to embodiments, the wagering game machine 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc.

The wagering game machine 100 comprises a housing 112 and includes input devices, including value input devices 118 and a player input device 124. For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information. While some components of the wagering game machine 100 are described herein, numerous other elements can exist and can be used in any number or combination to create varying forms of the wagering game machine 100.

The value input devices 118 can take any suitable form and can be located on the front of the housing 112. The value input devices 118 can receive currency and/or credits inserted by a player. The value input devices 118 can include coin acceptors for receiving coin currency and bill acceptors for receiving paper currency. Furthermore, the value input devices 118 can include ticket readers or barcode scanners for reading information stored on vouchers, cards, or other tangible portable storage devices. The vouchers or cards can authorize access to central accounts, which can transfer money to the wagering game machine 100.

The player input device 124 comprises a plurality of push buttons on a button panel 126 for operating the wagering game machine 100. In addition, or alternatively, the player input device 124 can comprise a touch screen 128 mounted over the primary display 114 and/or secondary display 116.

The various components of the wagering game machine 100 can be connected directly to, or contained within, the housing 112. Alternatively, some of the wagering game machine's components can be located outside of the housing 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of mechanical reels to display the outcome. In FIG. 1, the wagering game machine 100 is an "upright" version in which the primary display 114 is oriented vertically relative to the player. Alternatively, the wagering game machine can be a "slant-top" version in which the primary display 114 is slanted at about a thirty-degree angle toward the player of the wagering game machine 100. In yet another embodiment, the wagering game machine 100 can exhibit any suitable form factor, such as a free standing model, bartop model, mobile handheld model, or workstation console model.

A player begins playing a basic wagering game by making a wager via the value input device 118. The player can initiate play by using the player input device's buttons or touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game machine 100 can also include an information reader 152, which can include a card reader, ticket reader, bar code scanner, RFID transceiver, or computer readable storage medium interface. In some embodiments, the information reader 152 can be used to award complimentary services, restore game assets, track player habits, etc.

Example Portable Wagering Game Machine

Figure 2:
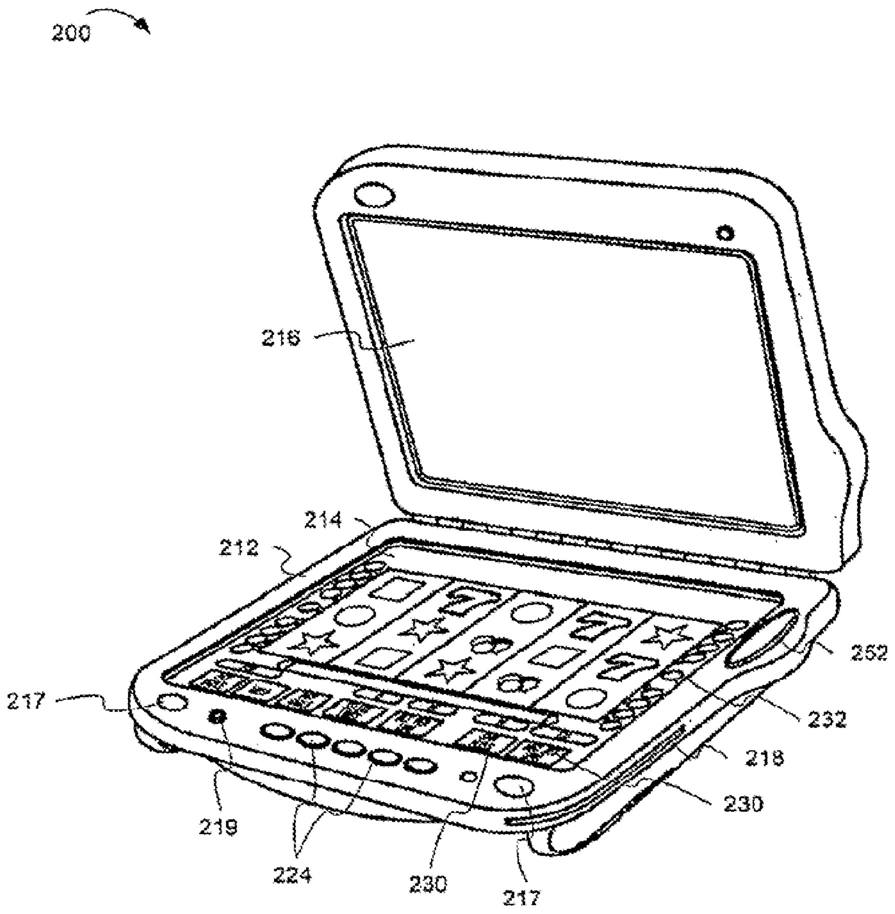
FIG. 2 shows an example embodiment of a portable wagering game machine.

FIG. 2 shows an example embodiment of a portable wagering game machine 200. Like free standing wagering game machines, in a handheld or mobile form, the wagering game machine 200 can include any suitable electronic device configured to play a video casino games such as blackjack, slots, keno, poker, blackjack, and roulette. The wagering game machine 200 comprises a housing 212 and includes input devices, including a value input device 218 and a player input device 224. For output, the wagering game machine 200 includes a primary display 214, a secondary display 216, one or more speakers 217, one or more player-accessible ports 219 (e.g., an audio output jack for headphones, a video headset jack, etc.), and other conventional I/O devices and ports, which may or may not be player-accessible. In the embodiment depicted in FIG. 2, the wagering game machine 200 comprises a secondary display 216 that is rotatable relative to the primary display 214. The optional secondary display 216 can be fixed, movable, and/or detachable/attachable relative to the primary display 214. Either the primary display 214 and/or secondary display 216 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 218 can comprise, for example, a slot located on the front, side, or top of the casing 212 configured to receive credit from a stored-value card (e.g., casino card, smart card, debit card, credit card, etc.) inserted by a player. The player-accessible value input device 218 can also comprise a sensor (e.g., an RF sensor) configured to sense a signal (e.g., an RF signal) output by a transmitter (e.g., an RF transmitter) carried by a player. The player-accessible value input device 218 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 200.

Still other player-accessible value input devices 218 can require the use of touch keys 230 on the touch-screen display (e.g., primary display 214 and/or secondary display 216) or player input devices 224. Upon entry of player identification information and, preferably, secondary authorization information (e.g., a password, PIN number, stored value card number, predefined key sequences, etc.), the player can be permitted to access a player's account. As one potential optional security feature, the wagering game machine 200 can be configured to permit a player to only access an account the player has specifically set up for the wagering game machine 200. Other conventional security features can also be utilized to, for example, prevent unauthorized access to a player's account, to minimize an impact of any unauthorized access to a player's account, or to prevent unauthorized access to any personal information or funds temporarily stored on the wagering game machine 200.

The player-accessible value input device 218 can itself comprise or utilize a biometric player information reader which permits the player to access available funds on a player's account, either alone or in combination with another of the aforementioned player-accessible value input devices 218. In an embodiment wherein the player-accessible value input device 218 comprises a biometric player information reader, transactions such as an input of value to the wagering game machine 200, a transfer of value from one player account or source to an account associated with the wagering game machine 200, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 218 comprising a biometric player information reader can require a confirmatory entry from another biometric player information reader 252, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 218 can be provided remotely from the wagering game machine 200.

The player input device 224 comprises a plurality of push buttons on a button panel for operating the wagering game machine 200. In addition, or alternatively, the player input device 224 can comprise a touch screen mounted to a primary display 214 and/or secondary display 216. In one aspect, the touch screen is matched to a display screen having one or more selectable touch keys 230 selectable by a user's touching of the associated area of the screen using a finger or a tool, such as a stylus pointer. A player enables a desired function either by touching the touch screen at an appropriate touch key 230 or by pressing an appropriate push button on the button panel. The touch keys 230 can be used to implement the same functions as push buttons. Alternatively, the push buttons 226 can provide inputs for one aspect of the operating the game, while the touch keys 230 can allow for input needed for another aspect of the game. The various components of the wagering game machine 200 can be connected directly to, or contained within, the casing 212, as seen in FIG. 2, or can be located outside the casing 212 and connected to the casing 212 via a variety of wired (tethered) or wireless connection methods. Thus, the wagering game machine 200 can comprise a single unit or a plurality of interconnected (e.g., wireless connections) parts which can be arranged to suit a player's preferences.

The operation of the basic wagering game on the wagering game machine 200 is displayed to the player on the primary display 214. The primary display 214 can also display the bonus game associated with the basic wagering game. The primary display 214 preferably takes the form of a high resolution LCD, a plasma display, an LED, or any other type of display suitable for use in the wagering game machine 200. The size of the primary display 214 can vary from, for example, about a 2-3" display to a 15" or 17" display. In at least some embodiments, the primary display 214 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 214 and/or secondary display 216 can have a 16:9 aspect ratio or other aspect ratio (e.g., 4:3). The primary display 214 and/or secondary display 216 can also each have different resolutions, different color schemes, and different aspect ratios.

As with the free standing embodiments a wagering gaming machine, a player begins play of the basic wagering game on the wagering game machine 200 by making a wager (e.g., via the value input device 218 or an assignment of credits stored on the handheld gaming machine via the touch screen keys 230, player input device 224, or buttons 226) on the wagering game machine 200. In some embodiments, the basic game can comprise a plurality of symbols arranged in an array, and includes at least one payline 232 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 218 of the wagering game machine 200 can double as a player information reader 252 that allows for identification of a player by reading a card with information indicating the player's identity (e.g., reading a player's credit card, player ID card, smart card, etc.). The player information reader 252 can alternatively or also comprise a bar code scanner, RFID transceiver or computer readable storage medium interface. In one embodiment, the player information reader 252 comprises a biometric sensing device.

Figure 3:
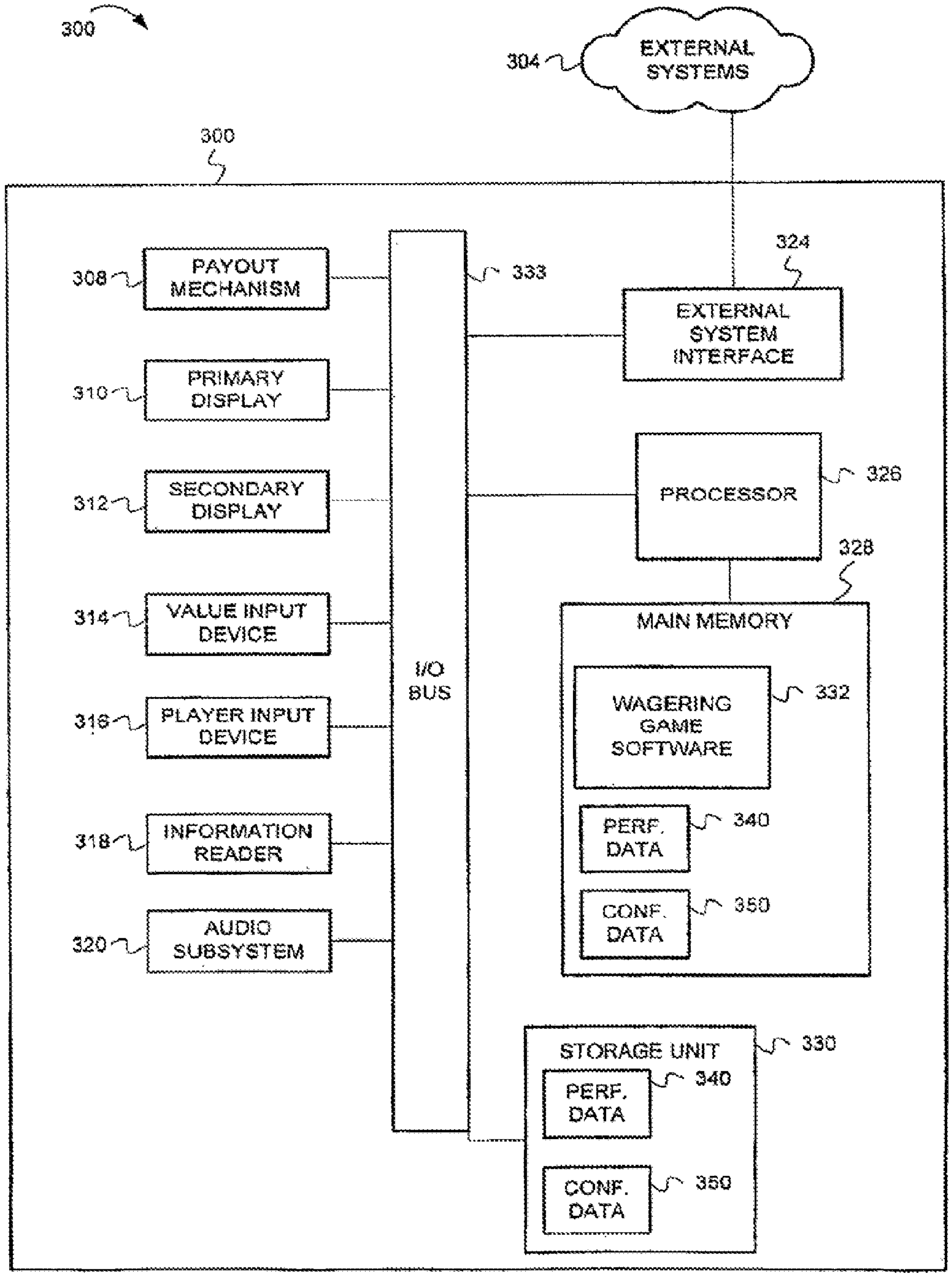
FIG. 3 is a block diagram illustrating a wagering game machine architecture, including a control system, according to example embodiments of the invention.

FIG. 3 is a block diagram illustrating a wagering game machine architecture 300, including a control system, according to example embodiments of the invention. As shown in FIG. 3, the wagering game machine 306 includes a central processing unit (CPU) 326 connected to main memory 328, which is a machine readable medium that may store instructions and data for wagering game software 332, performance data 340, and configuration data 350. In one embodiment, the wagering game software can include software associated with presenting wagering games, such as video poker, video black jack, video slots, video lottery, etc., in whole or part. In addition, wagering game software 332 may include bonus rounds, themes, advertising content, attract mode content, pay tables, denomination tables, audio files, video files, operating system files and other software associated with a wagering game or the operation of a wagering game machine.

The CPU 326 is also connected to an input/output (I/O) bus 322, which facilitates communication between the wagering game machine's components. The I/O bus 322 is connected to a payout mechanism 308, primary display 310, secondary display 312, value input device 314, player input device 316, information reader 318, and storage unit 330. The player input device 316 can include the value input device 314 to the extent the player input device 316 is used to place wagers. The I/O bus 322 is also connected to an external system interface 324, which is connected to external systems 304 (e.g., wagering game networks).

Figure 4:
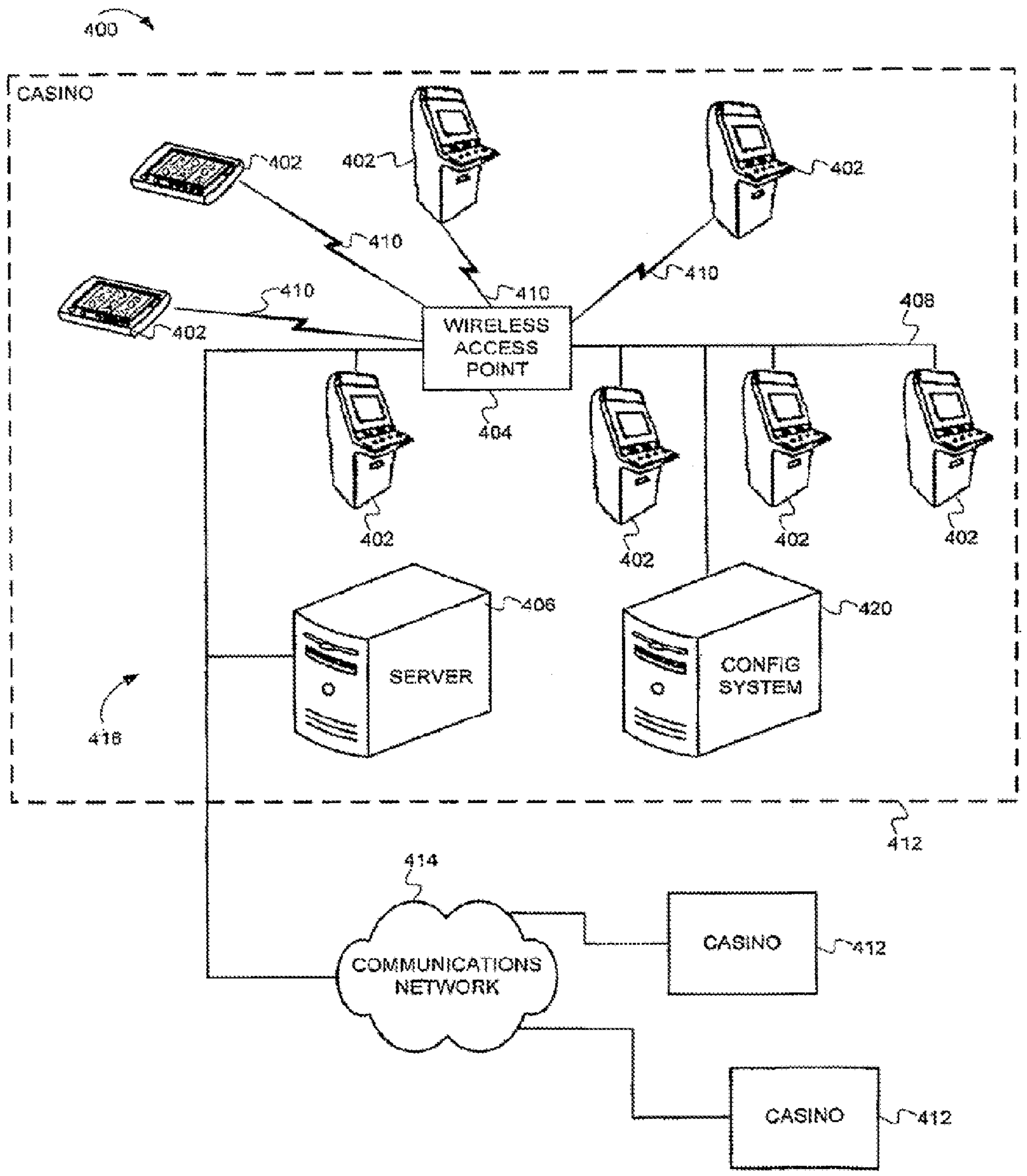
FIG. 4 is a block diagram illustrating a wagering game network, according to example embodiments of the invention.

Wagering game software 332 may be loaded from storage unit 330, or it may be loaded from external systems 304 such as servers of other systems on a wagering game network (illustrated further in FIG. 4). In general, wagering game software 332 comprises modules or units that operate to present one or more wagering game upon which monetary value may be wagered.

Storage unit 330 comprises a machine-readable medium such as a flash memory, hard drive, CD-ROM, DVD-ROM or any other type of device that can provide a persistent storage for data and instructions. In some embodiments, storage unit 330 stores performance data 340 and/or configuration data 350.

Performance data 340 comprises data regarding the operation of a wagering game machine. Various combinations and types of data may be stored as performance data. The performance data may include one or more of the following:

- Coin in The monetary value input into the wagering game machine to purchase game play.
- Theoretical win Coin in value multiplied by the hold percentage, where the hold percentage comprises the percentage of coin in held by the casino (e.g. 100%—payback percentage).
- Occupancy Percentage of time the wagering game machine is occupied (e.g. not idle).

The above are examples of performance data that may be maintained by a wagering game machine. Those of skill in the art will appreciate that other types of performance data may be maintained and such performance data is within the scope of the inventive subject matter.

The performance data may be associated with time data, such as a period of time during which the data was collected.

Configuration data 350 may include various parameters that affect the operation of a wagering game machine or the wagering games presented on the wagering game machine. Examples of such configuration data that may be stored on a wagering game machine include one or more of the following:

- Line count The number of lines of symbols to be displayed on a wagering game machine.
- Paylines The lines in a matrix of symbols that may be used to determine a winning combination of symbols. The paylines may be defined to be straight, horizontal, vertical, diagonal, or may take an arbitrarily defined path through the symbols.

- Themes Images, audio, and video content the describe a theme for the wagering game machine. For example, a wagering game theme may based on a television show or board game.
- Bonus rounds Content, including software, audio, image, and video content that provides a bonus round when triggered by a wagering game.
- Episodic Content Content associated with episodes of a bonus round or wagering game.
- Attract Content Content (images, audio and/or video) presented when the wagering game machine is idle (i.e., in "attract" mode) to attempt to attract players to the machine.
- Denomination The amount required for a single game play (e.g., 5 cents, 10 cents, 1 dollar, 5 dollars etc.).
- Pay tables Tables that determine the wagering game machines payout upon the occurrence of various combinations of symbols, cards, dice, numbers, etc.
- Max wager amount The maximum amount that may be wager on any single round of wagering game play.
- Progressive Game Determines which, if any, progressive game the wagering game machine participates in.
- Play Mechanics Determines aspects of how the wagering game may be played or presented. Examples of aspects include cascading reels, free spins, line combinations and other aspects of a wagering game definition.

The above are examples of configuration data that may be maintained by a wagering game machine. Those of skill in the art will appreciate that other types of configuration data may be maintained and such configuration data is within the scope of the inventive subject matter.

In one embodiment, the wagering game machine architecture 300 can include additional peripheral devices and/or more than one of each component shown in FIG. 3. For example, the peripherals may include a bill validator, a printer, a coin hopper, a button panel, or any of the many peripherals now found in wagering game machines or developed in the future. Further, in some embodiments, the wagering game machine 306 can include multiple external system interfaces 324 and multiple CPUs 326. In one embodiment, any of the components can be integrated or subdivided. Additionally, in one embodiment, the components of the wagering game machine 306 can be interconnected according to any suitable interconnection architecture (e.g., directly connected, hypercube, etc.).

Example Wagering Game Network

FIG. 4 is a block diagram illustrating a wagering game network, according to example embodiments of the invention. As shown in FIG. 4, the wagering game network 400 includes a plurality of casinos 412 connected to a communications network 414.

Some or all of the plurality of casinos 412 include a local area network 416, which includes a wireless access point 404, wagering game machines 402, a configuration system 420 and a wagering game server 406 that can exchange performance data, configuration data and wagering games over the local area network 416. To facilitate such communications, the local area network 416 may include wireless communication links 410 and/or wired communication links 408. The wired and wireless communication links can employ any suitable connection technology, such as Bluetooth, 802.11, Ethernet, public switched telephone networks, SONET, etc. In one embodiment, the wagering game server 406 can serve wagering games to devices located in other casinos 412 or at other locations on the communications network 414. Similarly, in one embodiment, the configuration system 420 can send and receive performance data and configuration data to devices located in other casinos 412 or at other locations on the communications network 414.

The wagering game machines 402, wagering game server 406, and configuration system 420 can include hardware and machine-readable media including instructions for performing the operations described herein.

The wagering game machines 402 described herein can take any suitable form, such as floor standing models, handheld mobile units, bartop models, workstation-type console models, etc. Further, the wagering game machines 402 can be primarily dedicated for use in conducting wagering games, or can include non-dedicated devices, such as mobile phones, personal digital assistants, personal computers, etc. In one embodiment, the wagering game network 400 can include other network devices, such as accounting servers, wide area progressive servers, player tracking servers, and/or other devices suitable for use in connection with embodiments of the invention.

Example Wireless Environment

In some embodiments, the wireless access point 404 and wagering game machines 402 can communicate using any now know or future developed wireless communications signals. Examples of such signals include orthogonal frequency division multiplexed (OFDM) communication signals over a multicarrier communication channel, spread-spectrum signals.

In some embodiments, the wireless access point 404 can be included in a communication station, such as wireless local area network (WLAN) communication station including a Wireless Fidelity (WiFi) communication station, or a WLAN access point (AP). In these embodiments, the wagering game machines 402 can be included in a mobile station, such as WLAN mobile station or a WiFi mobile station.

In some embodiments, the wireless access point 404 can be included in a broadband wireless access (BWA) network communication station, such as a Worldwide Interoperability for Microwave Access (WiMax) communication station, since the wireless access point 404 can be included in almost any wireless communication device. The wagering game machines 402 can also form part of a BWA network communication station, such as a WiMax communication station.

In some embodiments, the wireless access point 404 and the wagering game machines 402 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 404 and the wagering game machines 402 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In other embodiments, the wireless access point 404 and the wagering game machines 402 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 404 and the wagering game machines 402 can communicate in accordance with an ultra-wideband (UWB) communication technique where a carrier frequency is not used. In other embodiments, the wireless access point 404 and the wagering game machines 402 can communicate in accordance with an analog communication technique. In other embodiments, the wireless access point 404 and the wagering game machines 402 can communicate in accordance with an optical communication technique, such as the Infrared Data Association (IrDA) standard. In some embodiments, the wireless access point 404 and the wagering game machines 402 can communicate in accordance with the Home-RF standard which can be in accordance with a Home-RF Working Group (HRFWG) standard.

In some embodiments, the wireless access point 404 can be part of a communication station, such as wireless local area network (WLAN) communication station including a Wireless Fidelity (WiFi) communication station, or a WLAN access point (AP). In these embodiments, the wagering game machines 402 can be part of a mobile station, such as WLAN mobile station or a WiFi mobile station.

In some other embodiments, the wireless access point 404 can be part of a broadband wireless access (BWA) network communication station, such as a Worldwide Interoperability for Microwave Access (WiMax) communication station, as the wireless access point 404 can be part of almost any wireless communication device. In these embodiments, the wagering game machines 402 can be part of a BWA network communication station, such as a WiMax communication station.

In some embodiments, the wireless access point 404 and the wagering game machines 402 can communicate in accordance with standards such as the Pan-European mobile system standard referred to as the Global System for Mobile Communications (GSM). In some embodiments, the wireless access point 404 and the wagering game machines 402 can also communicate in accordance with packet radio services such as the General Packet Radio Service (GPRS) packet data communication service. In some embodiments, the wireless access point 404 and the wagering game machines 402 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access point 404 and the wagering game machines 402 can provide packet data services (PDS) utilizing packet data protocols (PDP). In other embodiments, the wireless access point 404 and the wagering game machines 402 can communicate in accordance with other standards or other air-interfaces including interfaces compatible with the enhanced data for GSM evolution (EDGE) standards (see 3GPP Technical Specification, Version 3.2.0, March 2000).

In some embodiments, any of the wagering game machines 402 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

Figure 5:
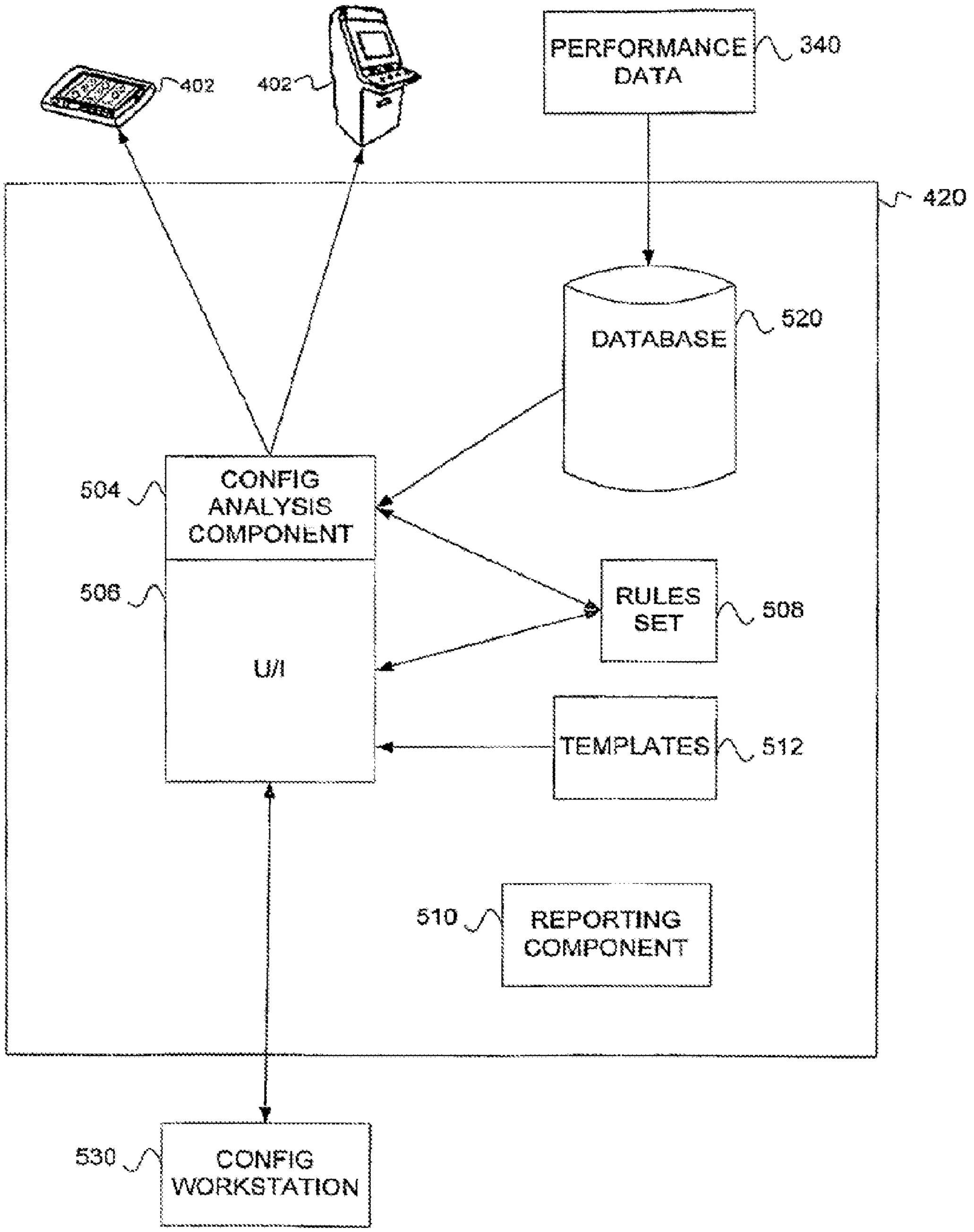
FIG. 5 is a block diagram illustrating a configuration system according to example embodiments of the invention.

FIG. 5 is a block diagram providing further details of a configuration system 420 according to example embodiments of the invention. In some embodiments, configuration system 420 includes a configuration analysis component 504, a user interface (U/I) 506, a database 520 and rules set 508.

As noted above, wagering game machines 402 may store and maintain performance data 340. The performance data 340 may be periodically sent to configuration system 420 for use in generating configurations for wagering game machines. In some embodiments, the performance data 340 received from one or more wagering game machines may be stored in database 520. Database 520 may be a relational database, a hierarchical database, a set of one or more files in a file system, or any other time of data storage system.

Configuration analysis component 504 reads the performance data from database 520 and applies rules defined in rules set 508 to determine new configurations to be applied to one or more wagering game machines based on the performance data and the rules in rule set 508. As a general example, the rules may be defined such that the wagering game machines that perform in the lowest 20% when compared to other wagering game machines receive new configurations. The new configurations may also be determined based on rules in rule set 508. For example, the bottom 20% performing machines may be replaced with configurations similar to the upper 20% performing machines. Many other types of rules and combinations of rules are possible and within the scope of the inventive subject matter.

For example, rules related to performance may vary depending on the goals of the casino or gaming establishment. If revenue maximization is a goal, then the rules related to determining performance may use coin-in as a base measurement of performance. Alternatively, if the casino wants to maximize occupancy in the short term in order to hopefully realize more revenue in the long term, then rules based on occupancy data may be used to determine performance of a wagering game machine.

Performance may also be analyzed over time and rated. For example, trends over time may be used to determine performance of a wagering game machine. Thus rules may specify that a wagering game machine that is not in the bottom 20% of current revenue, but where the trend indicates declining revenue may be reconfigured, while a machine that is in the bottom 20% of current revenue, but where the trend indicates rising revenue for the machine may be determined to not need reconfiguration.

Similarly rules associated with generating configurations may vary depending on the goals of the casino. If revenue maximization is a goal, the configurations designed to generate more revenue may be created. Likewise, if maximizing occupancy is a goal, then configurations designed to provide maximum occupancy may be created.

Rules in rule set 508 may be designed to take into account various factors when determining a configuration for one or more wagering game machines. For example, the rules may be defined such that a particular mix of themes, denominations, and/or wagering game types should be maintained, perhaps in order to attempt to maximize revenue. Further, the rules may take into account pairings of particular bonus rounds and particular wagering games, pairings of wagering games or other combinations of bonus rounds, themes, episodes, and wagering games that may result in increased revenue and/or occupancy.

In some embodiments, database 520 maintains location data for the wagering game machines on a casino floor. The location data may then be used by configuration analysis component 504 to determine the themes, denominations and/or wagering game types that should be configured for wagering game machines in particular locations. Using a location in generating a configuration is desirable, because it may be beneficial to locate certain themes, denominations and/or wagering game machine types in particular locations. For example, it may be desirable to locate games having a similar theme in one location. Further, it may be desirable to locate machines with particular denominations together, or in a particular location in a casino.

Location data may also include geographic location, such as a city, state, country, or region of a country. It may be desirable to include such location data because wagering patterns may be different in different areas of a country or in different countries of the world.

Further, it may be desirable to achieve a particular distribution of themes, denominations or wagering game types across a casino floor. For example, it may be desirable to maintain a certain mix of video reel based wagering games, mechanical reel based wagering games and card based wagering games. Rules may be defined that take these factors into account in order to generate a configuration for one or more wagering game machines.

Rules may also be time based. For example, it may be desirable to create configurations based on a time of day, day of week, time of year, or for special events that occur from time to time. For example, it may be desirable to reconfigure denominations based on time of day, with lower denominations used during the daytime and higher denominations used at night time. Similarly, there may be changes in wagering patterns over a year and configuration rules may be specified that take this into account.

Also, certain events may make it desirable to adjust denominations, paylines, pay tables or other configuration elements. For example, if a major boxing match is to occur on particular date, it may be desirable to configure wagering game machines with higher denominations, higher maximum bets, and/or higher line counts on the assumption that players that attend major boxing matches may also be willing to wager larger amounts.

The configuration analysis component 504 may take configuration costs into account in determining a configuration or recommended configuration. Some configuration changes may be made at no cost, or at a relatively low cost to a gaming establishment, while other configuration changes may come with a relatively high cost. For example, configuration changes to paylines, max wager amounts, or average payout may be made at no cost, while a configuration change that causes a new game, bonus round, or new episodic content may cost significant amounts of money to make (e.g. game cost, licensing fees etc.) Thus the configuration analysis component of some embodiments may measure the cost of a configuration change when determining what, if any, configuration changes may be used to improve the performance of one or more wagering game machines.

Configuration analysis component 504 may run in a number of different ways. In some embodiments, configuration analysis component 504 may run continuously or automatically at various times to reanalyze and generate new configurations based on current performance data. The new configurations may then be automatically sent to one or more wagering game machines. Alternatively, the configuration analysis component may generate an alert message that may be sent via user interface 506 to a casino operator alerting the operator that a new configuration has been generated. The operator may then review the configuration and confirm or modify the configuration via user interface 506 before the configuration is sent to the wagering game machines.

In alternative embodiments, configuration analysis component 504 may be run in response to a user initiating the configuration analysis component. Upon initiation, the configuration analysis component may analyze the performance data and generate new configurations for one or more wagering game machines. The configuration analysis component may then automatically send the new configuration, or may display a suggested configuration and allow for modification and/or confirmation via user interface 506 before automatically sending the configuration to one or more wagering game machines. Alternatively, the suggested configuration may be printed and then manually applied to the wagering game machines.

Rules in rule set 508 may be used to determine how configurations are sent to wagering game machines. For example, rules may specify that wagering game machines near casino entrances are to be updated before wagering game machines in the interior of a casino are updated.

Rule set 508 may be implemented in various ways in varying embodiments of invention. In some embodiments, rule set 508 may be implemented as a set of heuristics that are encoded as instructions in configuration analysis component 504. In alternative embodiments of the invention, rule set 508 may be defined in a rules definition language that may be input or edited via user interface 506. In further embodiments, rules set 508 may include rules that are discovered or defined with the assistance of a relationship discovery process. Examples of such processes include neural networks, cluster analysis, statistical analysis, artificial intelligence methods or other analysis methods designed to discover relationships in data. Further details on such analysis methodologies and systems may be found in published United States Published Patent Application 2004/0166940, entitled "Configuration of Gaming Machines."

User interface 506 may be used to present a graphical based or text based user interface to a user. The user interface may be presented to a configuration workstation 530, which may be communicably coupled, for example via a network, to the configuration system 420. The configuration workstation 530 may be based in the casino, or it may be offsite at another casino or third party responsible for administering configurations for the casino. For example, in some embodiments, the performance data may be generated at one or more casinos and sent to a third party for analysis. The third party may then provide a recommended configuration for one or more wagering game machines.

User interface 506 may be implemented in different ways in various embodiments of the invention. For example, in some embodiments, user interface 506 invokes the configuration analysis component 504 in order to have new configurations automatically generated. As noted above, the user interface may provide interface elements such as drop down menus, icons and buttons to allow a user to confirm, modify, or otherwise manipulate the generated configuration.

In some embodiments, user interface 506 provides a selection mechanism allowing a user to select a template configuration from a set of templates 512. The templates may provide predefined configurations or configuration rules that may be useful for certain situations, such as when a casino is being set up for the first time and no performance data is available.

Templates may be selected based on the anticipated characteristics of the casino or casino customer base. For example, one template may be used if the customer base tends to wager high amounts while a different template may be used if the customer base tends to wager low amounts. Similarly, templates may exist for high occupancy situations and other templates for low occupancy situations. Based on the selection of a particular template, the configuration analysis component may generate wagering game configurations in accordance with the template or with rules invoked by the template.

In some embodiments, user interface 506 may present a "wizard" style interface that leads the operator through a series of questions designed to determine the characteristics of the casino and/or casino customer base. After the questions have been answered, the configuration analysis component may select a template or rule set that best matches the characteristics based on the answers provided by the user.

In some embodiments, user interface 506 may be a configuration interface in which a user may manually generate a configuration for one or more wagering game machines. As the user is entering configuration parameters, the configuration analysis component may analyze the parameters and suggest an alternative setting for one or more parameters based on performance data 340 and rule set 508. For example, assume a user has configured a wagering game machine for a 15 line configuration. The configuration analysis component may determine that a 20 line configuration may be more likely to provide increased revenue. The configuration user interface 506 may present a pop-up window or other user interface element that provides a suggestion to use the alternative parameter.

Once a configuration has been defined, rules in rule set 508 may be used to determine how configurations are sent to wagering game machines. For example, rules may specify that wagering game machines near doors are to be updated before wagering game machines in the interior of a casino are updated.

Thus it can be seen from the above configuration system 420 may use performance data, heuristics and rules to specify how various combinations of themes, denominations, pay tables, line counts, coins per line, max wager amounts, hold percentages, episodes, or other configuration elements, perhaps in addition to other factors such as location or time, are to be used in configuring one or more wagering game machines. A new configuration may result in dramatic changes, such as new wagering games, bonus rounds, or episodes being configured for a wagering game machine. Alternatively a new configuration may result in relatively minor changes such as adjusting the hold percentage based on occupancy and average wager on a wagering game machine. The analysis may be based on absolute performance, for example, reconfiguring machines in the bottom $20^{th}$ percentile, or it may be based on performance trends, e.g. machines in which revenue has been declining for a period of time.

In some embodiments, configuration system 420 may include a reporting component 510. Reporting component 510 may generate reports showing wagering game machine performance over time, including reports indicating the effect of configuration changes on wagering game machine performance over time.

Example Operation

Figure 6:
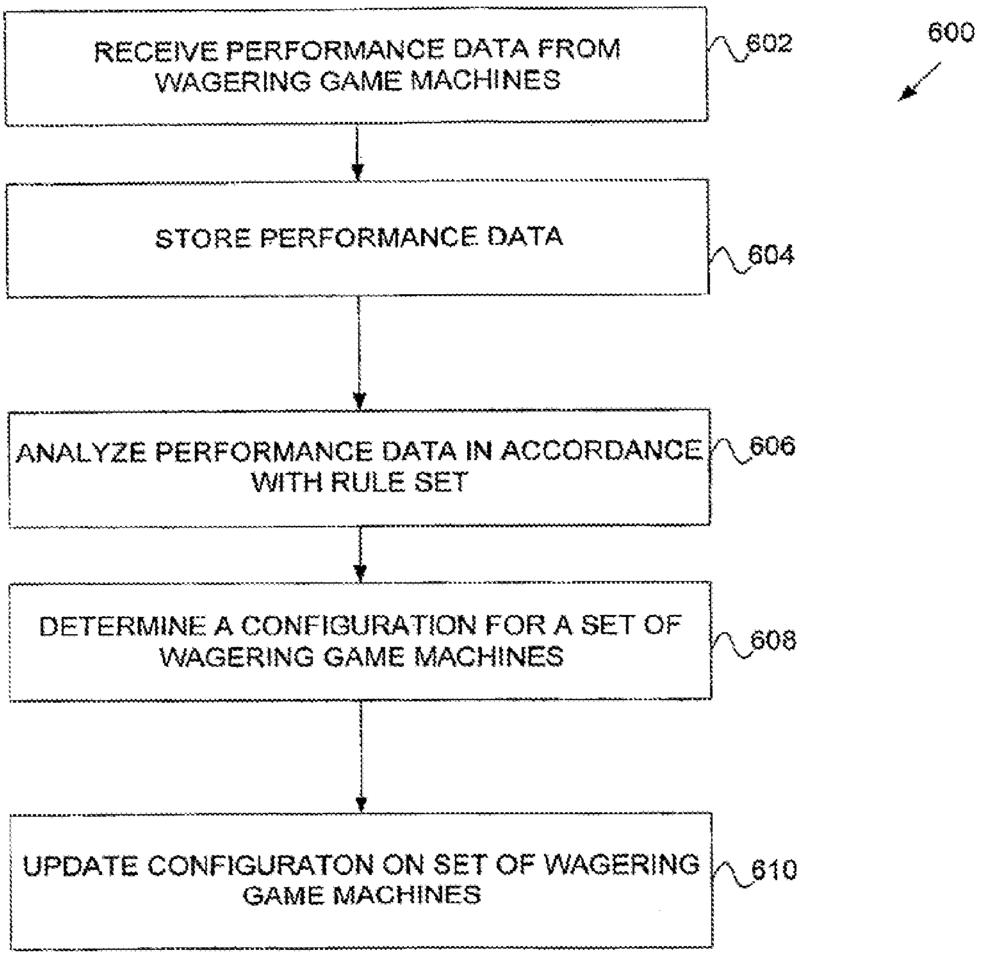
FIG. 6 is a flowchart illustrating a method for configuring one or more wagering game machines according to embodiments of the invention.

FIG. 6 is a flowchart illustrating a method 600 for configuring a wagering game machine according to embodiments of the invention. The method begins at block 602 by receiving performance data from one or more wagering game machines. The performance data may be received from some or all of the wagering game machines in a casino. Additionally, the performance data may be received from wagering game machines distributed across a number of different casinos or gaming establishments. The performance data may be received at regular intervals, or the performance data may be received with time stamps indicating a time interval during which the performance data was gathered.

At block 604 the performance data received from the wagering game machines may be stored in a database. Performance data for multiple time intervals may be stored in order to perform trend analysis or other historical based analysis.

At block 606 the stored performance data may be analyzed in accordance with a set of rules designed to determine low performing wagering game machines, or wagering game machines whose performance is on a downward trend.

At block 608, in some embodiments, a system executing the method determines a set of configuration parameters intended to increase the performance of one or more low performing wagering game machines.

In alternative embodiments, a system receives at least one configuration parameter value, analyzes the performance data, and provides a suggested alternative value for the for the configuration parameter based in the performance data.

At block 610, a configuration update for one or more wagering game machines may be provided. In some embodiments, the configuration update may be automatically sent to one or more wagering game machines. In alternative embodiments, a recommended configuration may be displayed to a user via a user interface and the user may provide a confirmation prior to the configuration being applied to one or more wagering game machines. In further alternative embodiments, a recommended configuration may be provided as a report.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A method of operating a wagering game machine configuration system including one or more processors, the method comprising:

selecting, by at least one of the one or more processors, at least one first configuration for a plurality of wagering game machines operable to present a wagering game upon which monetary value may be wagered;

presenting a wagering game on each of the plurality of wagering game machines after receiving, at a value input device of each of the plurality, a wager of sufficient funds to initiate the wagering game, the wagering game including determining a game outcome based, at least in part, on a random selection, and directing an electronic display device to display the game outcome;

receiving, at the configuration system, periodic performance data from the plurality of wagering game machines, the periodic performance data including a current revenue during a data collection period for each wagering game machine of the plurality;

storing the periodic performance data in a database operably coupled to the configuration system;

analyzing, by at least one of the one or more processors, the periodic performance data in accordance with a rule set, the rule set including comparing revenue trends over time of each wagering game machine of the plurality with the current revenue during the collection period of the plurality of wagering game machines; and instructing, by at least one of the one or more processors, the configuration system to determine, according to the rule set, a second configuration for one or more of the plurality of wagering game machines based, at least in part, on the comparison of the revenue trends over time of the one or more wagering game machines and the current revenue during the collection period of the plurality of wagering game machines; and instructing, by at least one of the one or more processors, the configuration system to update the configuration of the one or more wagering game machines according to the second configuration.

2. The method of claim 1, wherein the selecting is responsive to a user input at a user interface, and wherein the selection is one of a plurality of templates, each of the templates providing a different predefined configuration for a wagering game machines.

3. The method of claim 1, wherein the rule set specifies applying the second configuration to a wagering game machine with a current revenue below a specified threshold when compared to the plurality of wagering game machines.

4. The method of claim 1, wherein the rule set specifies applying the second configuration to a wagering game machine with a current revenue less than the current revenue of the plurality of wagering game machines.

5. The method of claim 1, wherein the rule set specifies applying the second configuration to a wagering game machine with a current revenue in the $20^{th}$ percentile or lower when compared to the current revenue of the plurality of wagering game machines.

6. The method of claim 1, further comprising receiving, at the configuration system, a configuration parameter value and wherein instructing the configuration system to determine a second configuration includes providing a recommended value for the configuration parameter value.

7. A non-transitory machine-readable medium having machine executable instructions for causing one or more processors to perform a method, the method comprising:

selecting, from a plurality of templates, a first configuration for a wagering game machine, wherein each of the templates provides a different predefined configuration for the wagering game machine;

while the wagering game machine operates according to the first configuration, presenting a wagering game upon which monetary value may be wagered and maintaining performance data;

receiving periodic performance data from the wagering game machine, the periodic performance data including a current revenue during a data collection period for the wagering game machine;

storing the periodic performance data in a database;

analyzing the periodic performance data in accordance with a rule set, the rule set including comparing revenue trends over time of each of the plurality of wagering game machines with the current revenue during the collection period of the plurality of wagering game machines;

determining, according to the rule set, a second configuration for one or more of the plurality of wagering game machines based, at least in part, on the analyzed periodic performance data; and sending the second configuration to the wagering game machine wherein subsequent operation of the wagering game machine is in accordance with the second configuration.

8. The machine-readable medium of claim 7, wherein the one of more processors communicate with the wagering game machine over a communications network.

9. The machine-readable medium of claim 7, wherein the second configuration is applied according to one or more rules in the rule set.

10. The machine-readable medium of claim 7, wherein the rule set specifies applying the second configuration to a wagering game machine with a current revenue less than the current revenue of the plurality of wagering game machines.

11. The machine-readable medium of claim 7, wherein the rule set specifies applying the second configuration to a wagering game machine with a current revenue in the $20^{th}$ percentile or lower of the current revenue of the plurality of wagering game machines.

12. The machine-readable medium of claim 7, wherein the rule set utilizes at least one of coin-in, theoretical win, and occupancy to determine wagering game performance in comparison to a specified threshold .

13. A system comprising:

a plurality of wagering game machines operating for periods of time to present a wagering game upon which monetary value may be wagered, and to maintain periodic performance data during the respective operating periods, the periodic performance data including a current revenue during a data collection period for each of the plurality of wagering game machines, each of the plurality of wagering game machines operating according to a respective configuration to randomly select a game outcome, and to direct an electronic display device to display the wagering game outcome;

a configuration system, including one or more processors, communicably coupled to the plurality of wagering game machines, wherein at least one of the one or more processors of the configuration system is operable to:

receive the periodic performance data from the plurality of wagering game machines;

determine which of the machines in the plurality have periodic performance data in a lowest percentile of a predetermined value among the plurality of wagering game machines; and modify the configuration of the machines in the plurality having the periodic performance data in the lowest percentile of the predetermined value.

14. The system of claim 13, wherein the machines with the modified configurations are machines having periodic performance data in the lowest $20^{th}$ percentile of the predetermined value.

15. The system of claim 14, wherein the periodic performance data further includes one or more configuration parameters and wherein modifying the machines includes providing a recommended value for at least one of the one or more configuration parameters.

16. The system of claim 14, wherein the system modifies the configuration of machines having periodic performance data below a specified threshold value.

17. The system of claim 14, wherein the system modifies the configuration of machines having periodic performance data above the lowest percentile and indicating the performance data is trending downward.

18. The system of claim 14, wherein the system retains a current configuration of a machine having periodic performance data in the lowest percentile and indicating the performance data is trending upward.

19. The system of claim 14, wherein the periodic performance data used in the determination further includes one of coin-in, theoretical win, and occupancy.

20. The system of claim 13, wherein the modified configurations are similar to the configuration of a machine having periodic performance data in the highest $20^{th}$ percentile of the predetermined value.

* * * * *